Patented Dec. 16, 1924.

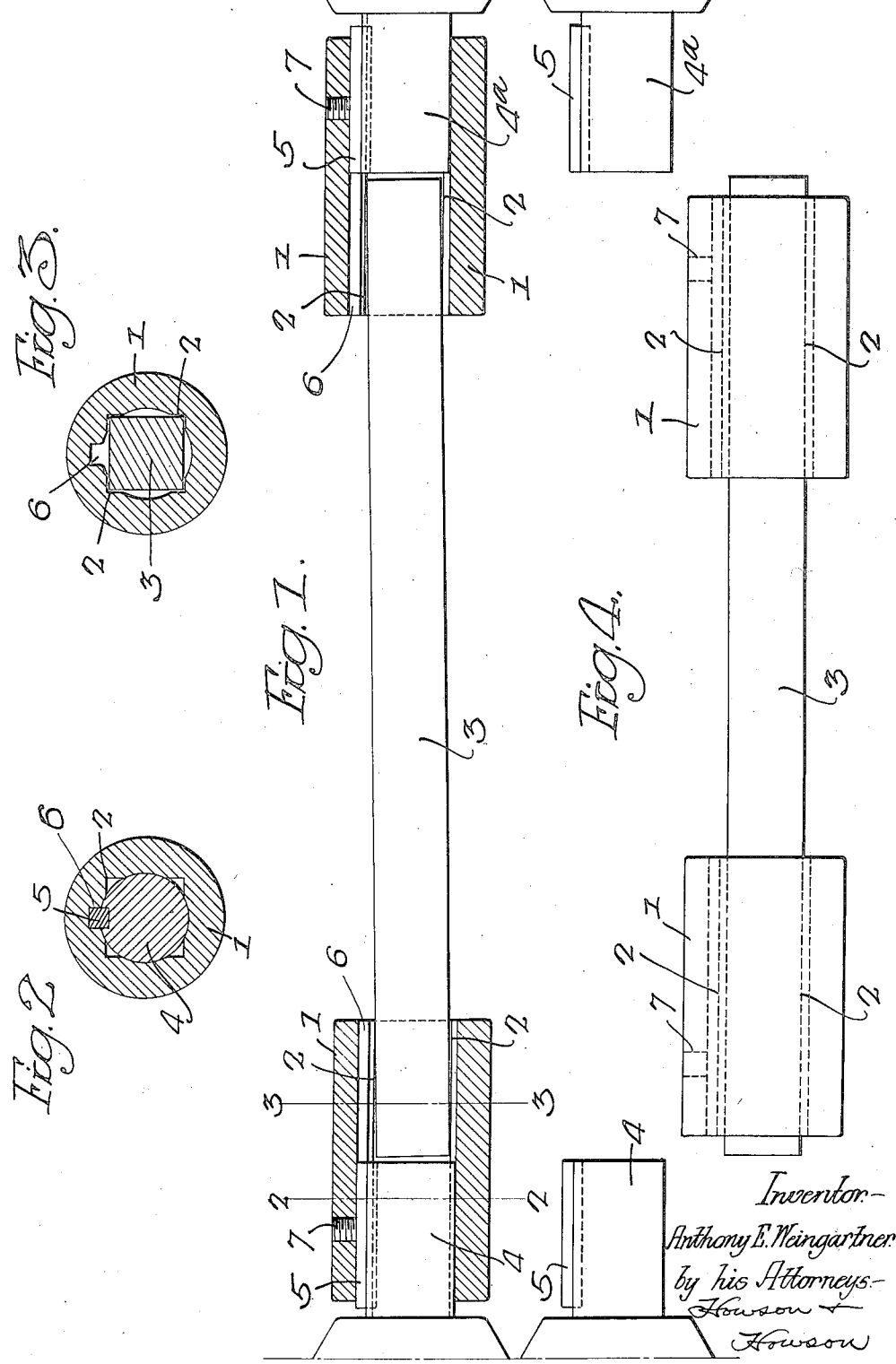

1,519,945

UNITED STATES PATENT OFFICE.

ANTHONY E. WEINGARTNER, OF PHILADELPHIA, PENNSYLVANIA, ASSIGNOR TO AMERICAN ENGINEERING COMPANY, OF PHILADELPHIA, PENNSYLVANIA, A CORPORATION OF PENNSYLVANIA.

COUPLING.

Application filed March 3, 1923. Serial No. 622,598.

*To all whom it may concern:*

Be it known that I, ANTHONY E. WEINGARTNER, a citizen of the United States, residing in Philadelphia, Pennsylvania, have invented a Coupling, of which the following is a specification.

One object of this invention is to provide a device for connecting and transmitting power between a driving and driven shaft whose alignment is subject to change within a limited degree such as may occur between the shaft sections connecting the power boxes of a stoker.

It is further desired to provide a shaft coupling of the above type which shall be simple, inexpensive and easily assembled with or removed from its associated elements.

These objects and other advantageous ends I attain as hereinafter set forth, reference being had to the accompanying drawings, in which, Fig. 1 is an elevation of a line of shafting showing in longitudinal vertical section, two shaft couplings constructed in accordance with my invention;

Figs. 2 and 3 are transverse vertical sections taken respectively on the lines 2—2 and 3—3 of Fig. 1; and, Fig. 4 is an elevation showing two shaft couplings mounted upon one of a shaft section preparatory to its insertion between and connection with the ends of driving and driven shaft sections.

In the above drawings, 1 represents a more or less elongated sleeve, which in accordance with my invention, has a longitudinally extending cylindrical bore for its entire length. The cylindrical curved wall of this bore or passage in the sleeve is longitudinally grooved in four equidistant lines also for the entire length of said sleeve as indicated at 2, so that it is fitted to receive a shaft 3 of square section and by reason of its circular bore may also receive a shaft 4 of circular section. The diameter of the circular bore or passage of the sleeves is such that it tightly fits the cylindrical shaft 4 and is rotatively connected thereto by a key 5 fitting into a key way 6 likewise extending therein for its full length. The grooves 2 which are angular in section being of such size and so placed that the square shaft 3 while rotatively connected to the sleeve 1, makes a loose fit therewith, so that as indicated in Fig. 1 it may operatively connect a driving shaft $4^a$ circular section with a driven shaft 4 even though these be considerably out of alignment. The sleeve 1 thus constitutes a relatively simple form of universal joint or coupling between either of the shafts 4 or $4^a$ and the shaft 3.

One material advantage of the above described construction is due to the fact that when it is desired to operatively connect the two shafts 4 and $4^a$ this may be done, as indicated in Fig. 4 by placing two coupling sleeves 1—1 on the square shaft 3 which is cut to the proper length to fit between the adjacent ends of said two shafts. After the square shaft 3 has been placed between the ends of the latter shafts, the two sleeves 1—1 are moved from the positions of Fig. 4 to the positions shown in Fig. 1 and are retained in these positions by set screws 7 so positioned as to engage and clamp in place the keys 5. Even though the driving and driven shaft 4 and $4^a$ are not in perfect alignment or in spite of slight alterations of their relative positions, the sleeves 1—1 serve to operatively connect them through the intermediate square shaft 3. Obviously, by releasing the set screws 7, said sleeves may be slid to rest wholly upon the square shaft 3 which with them may then be removed from between the shafts 4 and $4^a$.

I claim:

1. A coupling sleeve having a cylindrical bore for its entire length and having the cylindrical surface of said bore longitudinally slotted for the reception of a shaft of square section.

2. A coupling sleeve having a cylindrical bore for its entire length and having the cylindrical surface of said bore longitudinally slotted for the reception of a shaft of square section, there being a key way formed in the sleeve for its entire length.

3. The combination of a shaft of circular section; a second shaft of square section; with a sleeve connecting said shafts having circular bore to receive the cylindrical shaft and internally squared to receive the square shaft.

4. The combination of a shaft of circular section; a second shaft of square section; with a sleeve connecting said shafts having circular bore to receive the cylindrical shaft and internally squared to receive the square shaft; with a key connecting the cylindrical shaft to the sleeve.

5. The combination of a shaft of square section; a shaft of circular section; with a sleeve tightly fitting and non-rotatively fixed to the shaft of circular section and loosely but non-rotatively engaging the shaft of square section.

ANTHONY E. WEINGARTNER.